Nov. 26, 1940. H. S. JANDUS 2,222,619
FENDER SHIELD AND MOUNTING
Filed Dec. 30, 1938 3 Sheets-Sheet 3
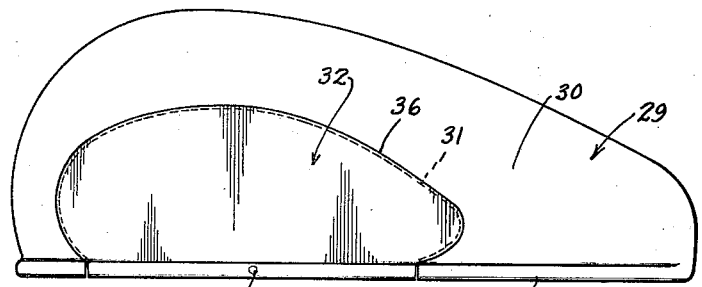
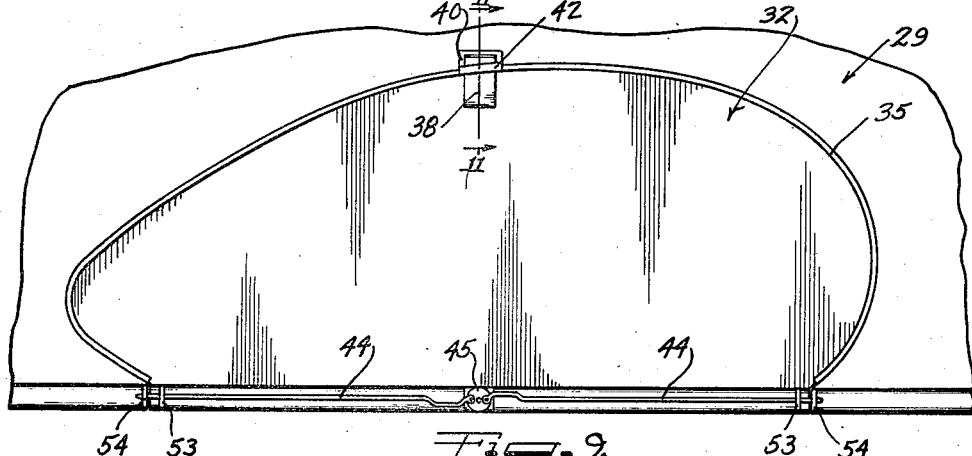
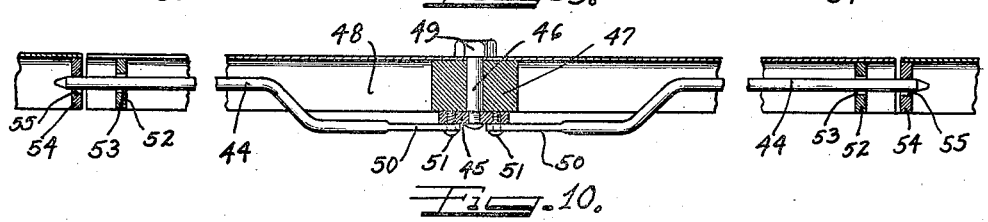
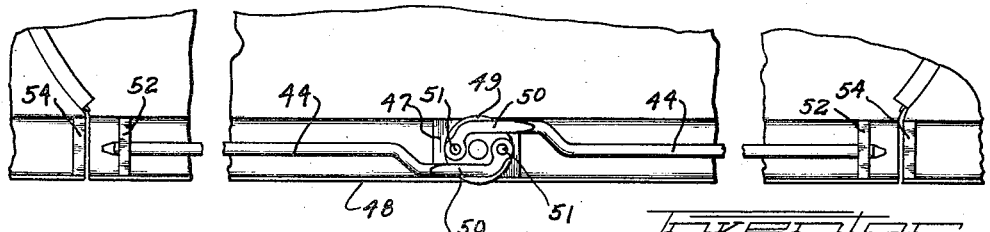
Herbert S. Jandus.

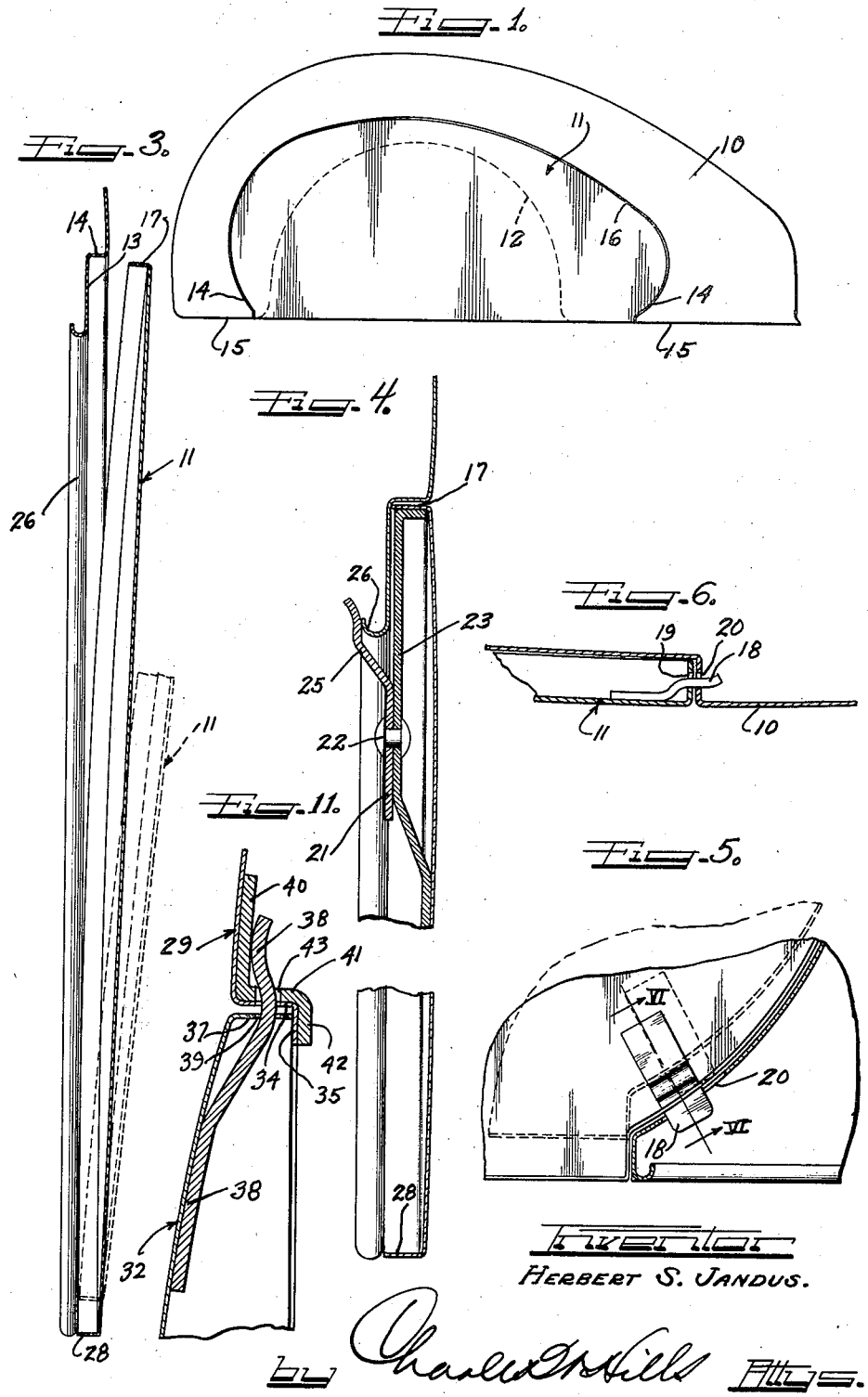

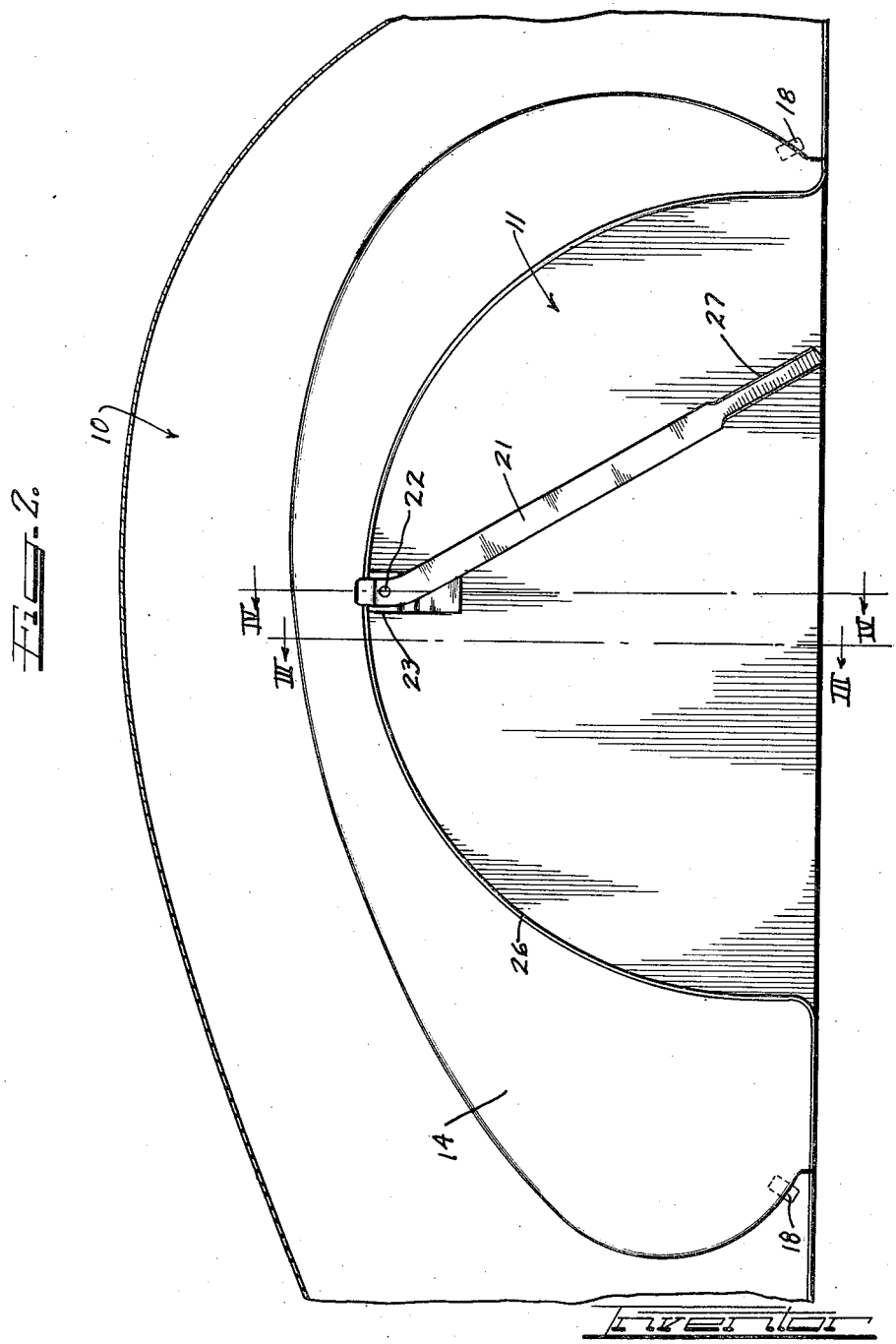

Patented Nov. 26, 1940

2,222,619

UNITED STATES PATENT OFFICE 2,222,619

FENDER SHIELD AND MOUNTING

Herbert S. Jandus, Detroit, Mich., assignor to Houdaille-Hershey Corporation, Detroit, Mich., a corporation of Michigan Application December 30, 1938, Serial No. 248,373

9 Claims. (Cl. 280—153)

This invention relates to fender shields and fender shield mountings and to the combination of the same with a vehicle fender, and more particularly to a fender shield and mounting in which the fender shield is progressively flexed or rocked into place as it is mounted on the vehicle fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in substantially an axial direction. Since this opening inherently presents an unattractive outward appearance, detachable fender shields have been employed to substantially cover this opening. As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel.

It is an object of the present invention to provide a novel fender shield and mounting.

It is a further object of this invention to provide a novel combination of fender shield and vehicle fender.

It is a still further object of this invention to provide a novel fender shield and fender assembly which is economical to manufacture, which readily permits the assembling of the fender shield on the fender, and which is rugged and reliable in use.

Another and further object of this invention is to provide a novel combination of a vehicle fender having a depressed portion therein adjacent the wheel access opening and in which the fender shield is supported in a novel manner thereon.

Another and still further object of this invention is to provide a novel assembly of a vehicle fender having a wheel access opening therein, the two lower corners of which are defined by inturned confronting neck portions and a fender shield supported on said inturned confronting neck portions.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender shield and fender assembly illustrating one embodiment of the present invention;

Figure 2 is an enlarged rear elevational view of the fender and fender shield assembly shown in Figure 1;

Figure 3 is a cross-sectional view of the fender and fender shield assembly taken along the line III—III of Fig. 2;

Figure 4 is an enlarged cross-sectional view of the fender and fender shield assembly taken along the line IV—IV of Figure 2;

Figure 5 is an enlarged fragmentary sectional view of the lower right hand portion of Figure 2;

Figure 6 is a cross-sectional view taken along the line VI—VI of Figure 5;

Figure 7 is a front elevational view of a different embodiment of the present invention;

Figure 8 is an enlarged rear elevational view of the fender shield and fender assembly shown in Figure 7;

Figure 9 is a cross-sectional plan view showing the locking arms which extend behind the lower base edge of the fender shield in Figure 8;

Figure 10 is an enlarged rear view of the locking mechanism shown in Figure 9; and Figure 11 is an enlarged sectional view of the locking ear taken along the line XI—XI of Figure 8.

Referring now to the preferred embodiment of the present invention as illustrated in Figures 1 to 6 of the drawings, there is illustrated therein a vehicle fender 10 of the high crown type which is commonly employed on motor vehicles of the present day. Mounted on and detachably secured to the fender 10 is a fender shield 11 which is preferably streamlined in shape, and designed to harmonize with the vehicle fender 10. The vehicle fender 10 is provided with a substantially semi-circular opening 12 in its outer depending side wall which affords access to the vehicle wheel (not shown) and permits removal of the wheel therethrough.

A portion of the outer depending side wall of the fender 10 adjacent the wheel opening 12 is recessed to provide an offset or recessed panel portion 13. The offset panel portion 13 is formed integral with the main body of the fender 10 and is connected therewith by a laterally extending shoulder 14. The outer marginal boundary of the panel portion 13 is defined by the shoulder 14 which extends in a gradual curve above the opening 12 and then down on each side of, and back towards the opening 12. That is to say, the ends of the shoulder 14 diverge upwardly in a gradually curved surface from the base edge 15 of the fender 10 until they reach a point of maximum spread or width at a point spaced upwardly from the base edge of the fender. The lower ends of the shoulder 14 thus provide an obliquely upwardly facing seat for supporting the fender shield 11 in a manner presently to be described.

The fender shield 11 is shaped to be substantially coextensive with the offset panel portion 13 of the fender 10, the curved edge 16 of the fender shield 11 being substantially complementary to the outline of the offset panel portion 13. The marginal portion of the fender shield 11 around the curved edge 16 is bent rearwardly as at 17 to form a flange which may be nested within the shoulder 14. The width of the flange 17 is preferably proportioned to permit the outer face of the fender shield 11 to form a substantially continuous surface with the adjacent outer face of the fender 10. Due to the fact that the shoulder 14 of the fender 10 turns back towards the opening 12 as it approaches the base edge 15 of the fender 10, it will at once be apparent that the fender shield 11 will be supported thereon when it is placed in position over the offset panel portion 13 of the fender 10. Additional means must, of course, be provided for preventing a lateral or outward movement of the fender shield away from the fender. Such means will now be described.

As may be seen best in Figures 5 and 6 of the drawings, the lower corners of the fender shield 11 are provided with obliquely downwardly extending latching ears 18 which are welded or otherwise suitably secured to the rear face of the fender shield 11 and which extend through appropriate apertures 19 in the flange portion 17. The shoulder 14 of the fender 10 is also appropriately slotted, as at 20, to receive the latching ear 18. Due to the fact that the ears 18 are disposed at an angle and by virtue of the fact that the latching ears are inserted in the slots 20 by a downward movement of the fender shield 11, it is clear that these slots 20 must be longer than the width of the ear 18, as is clearly shown in Figure 5. The free ends of the ears 18 are also preferably disposed at right angle with respect to the plane of the face of the fender shield 11 in order to provide a cam action which will pull the lower edge of the fender shield 11 into tight engagement with the fender 10 when the shield 11 is mounted thereon.

The latching means for clamping and retaining the top of the fender shield 11 in place on the fender 10 comprises a latching arm 21, which is pivotally mounted as at 22 on a reinforcing bracket 23 which is welded or otherwise suitably secured to the rear of the fender shield, as shown in Figures 2 and 4 of the drawings. The latching arm 21 includes an outwardly and upwardly bent latching portion 25 which is arranged to engage the underturned marginal portion 26 which defines the edge 12 of the fender 10. The latching portion 25 is so shaped that as it is angled into position behind the underturned portion 26, the inturned flange 17 of the fender shield 11 is cammed into tight engagement with the offset panel portion 13 of the fender 10. The opposite end of the latching arm 21 is shaped to provide a handle portion 27 which may be grasped by the operator by reaching under the fender shield 11. The lower end of the handle 27 is arranged to be positioned against the inturned base edge 28 of the fender shield 11.

As is shown in Figure 3, the fender shield 11 is shaped so that in an unflexed position it is not possible to seat fender shield 11 on the fender 10. More specifically, the fender shield 11 and particularly the curved edge 16 of the fender shield 11 flares slightly outwardly from its two lower corners away from the fender 10. It is thus necessary, as the fender shield 11 is moved into position on the fender 10, to progressively flex or wrap the fender shield 11 upwardly from its two lower corners towards the top, where it is clamped into place by the latching arm 21. It has been found that a fender shield constructed and mounted in this manner provides a much tighter fit with the fender upon which it is mounted, and is less subject to vibrations and rattling.

The manner in which the fender shield 11 is mounted on the fender 10 may best be understood by an inspection of Figures 2 and 3. The ears 18 at the two lower corners of the fender shield 11 are passed through the slots 20 in the shoulder 14 of the fender 10 and the fender shield 11 is pushed downwardly until the inturned flange 17 near the lower corner of the fender shield 11 is firmly seated on the lower portion of the shoulder 14. The fender shield 11 is thereafter rocked in a counterclockwise direction, as viewed in Figure 3 until the inturned flange 17 is snugly nested within the shoulder 14 of the fender 10 and against the offset panel portion 13. During this counterclockwise movement of the fender shield 11 into position on the fender 10, the curved edge 16 of the fender shield 11 as defined by the flange 17 is progressively flexed or wrapped against the offset panel portion 13 from the two lower corners of the fender shield upwardly around its curved edge towards the top of the fender shield. The top of the fender shield 11 is pulled into tight engagement with the fender 10 by rotating the latching arm 21 into engagement with the underturned portion 26 of the fender 10. The lower end of the latching arm 21 is then disposed on the inturned base flange 28 of the fender shield 11, the latching arm 21 preferably being slightly resilient such that it is normally urged toward the rear face of the panel portion of the fender shield 11. To remove the fender shield 11, it is simply necessary to rotate the latching arm 21 out of engagement with the underturned portion 26 of the fender 10, and the fender shield may then be lifted off the fender 10.

In Figures 7 to 11 of the drawings I have illustrated a different embodiment of the present invention. In Figures 7 and 8 I have illustrated a vehicle fender 29 of the high crown type having an outer depending side wall 30 which is provided with a streamlined wheel access opening 31 which is normally concealed by a detachable fender shield 32, which is shaped to cover and conceal the same. The lower edge of the fender 29 is provided with a molding 33 to improve the ornamental appearance of the same. The marginal portion of the fender 29 around the wheel access opening 31 is bent rearwardly, as at 34 and then radially as at 35 (see Figures 8 and 11).

As will readily be observed from a cursory inspection of the drawings, the radial portion 35 provides an offset flange against which the fender shield 32 may rest and the axially rearwardly extending portion 34 provides a shoulder which is substantially coextensive with the outer peripheral boundary of the fender shield 32. Since the opposite lower ends of the shoulder 34 converges as they approach the base edge of the fender 29 it is clear that the lower end portions of the shoulder 34 will provide a seat for vertically supporting the fender shield 32 in desired position thereon.

As was previously pointed out, the fender shield 11 is shaped to be substantially coextensive with the offset flange 35, the curved edge 36 of the fender shield 32 being substantially complementary to the outline of the offset flange 35 as defined by the shoulder 34. The marginal portion of the fender shield 32 around the curved edge 36 is bent rearwardly, as at 37 to form a flange which may be nested within the shoulder 34. The width of the flange 37 is preferably proportioned to permit the outer face of the fender shield 32 to form a substantially continuous surface with the adjacent outer downwardly depending wall portion 30 of the fender 29.

In the preferred embodiment of the invention illustrated in Figures 1 to 6 of the drawings, there was shown a fender shield which was supported on the converging end portions of a shoulder on the fender and in which fixed latching means were provided at the two lower corners of the fender shield and an angularly movable latching means provided at the top of the fender shield for retaining the fender shield in place on the fender. In the embodiment of the invention illustrated in Figures 7 to 11 of the drawings, a fender shield is shown which is supported by the lower converging ends of a shoulder on a vehicle fender, but in which the fixed latching means is located at the top of the shield while the movable latching means is provided at the bottom of the shield. As is shown in Figure 11, a latching ear 38 is welded or otherwise suitably secured to the rear face of the fender shield 32 and is arranged to extend upwardly through a suitable opening 39 in the rearwardly turned flange 37. A cooperating latching and reinforcing bracket 40 is welded to the rear face of the fender 29 and includes a portion 41 which extends across and lies in intimate contact with the shoulder 34 and a portion 42 which extends across and lies in intimate contact with the offset flange 35 to reinforce the same. The portion 41 is slotted as at 43 opposite the opening or slot 39 in the fender shield 32 to permit the latching ear 38 to pass therethrough. The latching ear 38 is shaped to cam or pull the upper part of the fender shield into tight, snug engagement with the fender 29.

The lower part of the fender shield 32 is latched into place by a pair of oppositely movable arms 44. The arms 44 are connected to a rotatable plate 45 which is substantially rigidly mounted on an operating bolt 46 journalled in a supporting block 47 which is welded or otherwise suitably secured to the rear face of the fender shield 32 adjacent the lower inturned base flange 48 thereof. The bolt 46 extends through the fender shield 32 from the front side, there being a suitable head or other operating medium 49 for rotating the bolt. The arms 44 are flattened at their ends adjacent the plate 45 as at 50, and are secured to the plate 45 by suitable pins 51 which are threaded at their ends for threaded engagement with the plate 45. Guide blocks 52 are provided near the corners of the fender shield 42 and are suitably apertured as at 53 for free movement therethrough of the arms 44. The guide blocks 52 are welded or otherwise suitably secured to the rear face of the fender shield 32 and to the inturned base flange 48. Latching blocks 54 are mounted on the fender 29 opposite the ends of the fender shield 32 and in alignment with the guide blocks 52. The latching blocks 54 are apertured as at 55 to receive the ends of the latching arms 44. The apertures 55 in the latching blocks 54 are preferably positioned so that as the ends of the latching arms 44 pass therethrough the lower corners of the fender shield 32 are pulled into tight engagement against the fender 29.

The latching arms in their locked positions are illustrated in Figure 8, while the unlocked position of the latching arms 44 is illustrated in Figure 10.

The fender shield 32 is preferably shaped so that in its unflexed position it will not conform nor seat itself on the fender 29, but which is progressively flexed or wrapped into place from the top of the shield downwardly around the curved edge 36 towards the two lower corners of the fender shield 32.

To mount the fender shield 32 in place on the fender 29 the ear 38 is inserted through the aperture 43 in the bracket 40 on the rear of the fender 29 and the lower portion of the fender shield 32 is then pressed inwardly, thereby causing a progressive flexing of the edge 36 of the fender shield 32 from the top of the shield toward the two lower corners. The inward flexing of the lower portion of the fender shield 32 is continued until the lower end portions of the rearwardly bent flange 37 are seated on the lower end portion of the shoulder 34 of the fender 29. The bolt 49 is then rotated so that the plate 45 is rotated from its position as shown in Figure 10 to its position as shown in Figures 8 and 9. This causes the latching arms 44 to pass through the latching plates 54 of the fender 29.

To dismount the fender shield 32 from the fender 29, the bolt 49 is rotated until the latching arms 44 pass out of engagement with the latching plate 54 and the fender shield 32 may thereafter be lifted out of engagement with the fender 29.

The broad basic idea of providing a fender shield which may be progressively flexed or wrapped into place is described in detail and claimed in a copending application of Arthur P. Fergueson and Jay Gould, U. S. Serial No. 233,919 filed October 8, 1938, and assigned to the same assignee as the present invention. The broad idea of vertically supporting a fender shield on converging lower end portions of a shoulder on the fender is described and claimed in the copending application of Donald Howard Mills, Serial No. 249,930, filed January 9, 1939, and assigned to the same assignee as the present invention.

While I have shown and described in connection with the two illustrated embodiments of the present invention a fender shield which may be progressively flexed or wrapped into place, it will of course be appreciated that many features of the present invention may be practiced without employing a fender shield which is progressively flexed or wrapped into place without departing from the spirit and scope of the present invention.

While I have shown particular embodiments of my invention, it will, of course, be understood, that I do not wish to be limited thereto, since many modifications may be made, and I, therefore, contemplate by the appended claims to cover all such modifications as fall within the true spirit and scope of my invention.

I claim as my invention:

1. In a fender and fender shield assembly, the combination comprising a fender having a wheel access opening therein and an offset panel portion adjacent said opening defined by a curved axially extending shoulder having converging lower end portions, and a fender shield substantially coextensive with said panel portion having an edge portion seated on said converging end portions of said shoulder, whereby said fender shield is vertically supported thereon, the lower portion of said fender shield having downwardly projecting latching ears thereon extending through said shoulder portion of said fender, and movable latching means at the top of said fender shield for engaging said fender and clamping said shield in place thereon.

2. In a fender and fender shield assembly, the combination comprising a fender having a wheel access opening therein and having an oiset panel portion adjacent said opening, said panel portion being connected with the principal body portion of said fender by an integral shoulder, and a fender shield mounted on said fender over said offset panel portion and said opening and substantially coextensive with said offset panel portion, said fender shield having projecting ears extending through said shoulder of said fender.

3. In a fender and fender shield assembly, the combination comprising a fender having a substantially semicircular wheel access opening therein and having an offset panel portion of different peripheral shape than said opening adjacent thereto, said offset panel portion having an axially outwardly extending shoulder extending from its outer peripheral boundary, the end portions of said shoulder in proximity to the base of said fender extending obliquely toward each other, and a fender shield for disposition on said fender over said opening, said shield being disposed and seated on said lower portions of said shoulder, and additional means for holding said shield against said fender in a transverse direction.

4. In a fender and fender shield assembly, the combination comprising a fender having a substantially semi-circular wheel access opening therein and having an offset panel portion of different peripheral shape than said opening adjacent thereto, said offset panel portion having an axially outwardly extending shoulder extending from its outer peripheral boundary, the end portions of said shoulder in proximity to the base of said fender extending obliquely toward each other, and a fender shield for disposition on said fender over said opening, said shield being disposed and seated on said lower portions of said shoulder, and additional means for holding said shield against said fender in a transverse direction, said additional means including a relatively fixed latching arm and a relatively movable latching arm spaced from each other, said relatively movable latching arm being disposed in proximity to said obliquely extending end portions of said shoulder, said fender shield being shaped and arranged to be progressively flexed from a point in proximity to said fixed latching arm to a point in proximity to said relatively movable latching arm.

5. In a fender and fender shield assembly, the combination comprising a fender having a substantially semi-circular wheel access opening therein and having an offset panel portion of different peripheral shape than said opening adjacent thereto, said offset panel portion having an axially outwardly extending shoulder extending from its outer peripheral boundary, the end portions of said shoulder in proximity to the base of said fender extending obliquely toward each other, and a fender shield for disposition on said fender over said opening, said shield being disposed and seated on said lower portions of said shoulder, and additional means for holding said shield against said fender in a transverse direction, said additional means including an upwardly projecting latch ear along the upper portion of said fender shield which extends through said shoulder, and a pair of oppositely extending movable latching arms mounted for movement along the base edge of said fender shield and extending into latching engagement with said fender.

6. In a fender and fender shield assembly, the combination comprising a fender having a wheel access opening therein, said fender having a radially inwardly facing shoulder extending in a curve of varying curvature about said wheel access opening and spaced therefrom, said shoulder extending in a curve across and above said wheel access opening, and then downwardly on each side of each opening and finally back toward the lower corners of said wheel access opening, the lower portions of said shoulder providing obliquely upwardly and radially inwardly facing seats, and a fender shield for disposition over said wheel access opening and being substantially coextensive with said shoulder, said fender shield having a rearwardly extending flange portion resting on said seats provided by the lower ends of said shoulder and supporting said fender shield thereon.

7. In a fender and fender shield assembly, the combination comprising a fender having a wheel access opening therein, said fender having a radially inwardly facing shoulder extending in a curve of varying curvature about said wheel access opening and spaced therefrom, said shoulder extending in a curve across and above said wheel access opening, and then downwardly on each side of each opening and finally back toward the lower corners of said wheel access opening, the lower portions of said shoulder providing obliquely upwardly and radially inwardly facing seats, and a fender shield for disposition over said wheel access opening and being substantially coextensive with said shoulder, said fender shield having a rearwardly extending flange portion resting on said seats provided by the lower ends of said shoulder and supporting said fender shield thereon, and latching means on said fender shield engageable with said fender for holding said fender shield on said seat.

8. In a fender and fender shield assembly, the combination comprising a fender having a wheel access opening therein and an offset panel portion adjacent said opening defined by a curved axially extending shoulder having converging lower end portions, and a fender shield substantially coextensive with said panel portion having an edge portion seated on said converging end portions of said shoulder, whereby said fender shield is vertically supported thereon, the lower portion of said fender shield having downwardly projecting latching ears thereon extending through said shoulder portion of said fender, a peripheral edge of said shield being developed so that it gradually diverges from said offset panel portion beginning at said latching ears and reaching a maximum at a point remote from said latching ears, and movable latching means at the top of said fender shield for engaging said fender and clamping said shield in place thereon and for pulling the entire peripheral edge of said shield into tight engagement with said offset panel portion.

9. In a fender and fender shield assembly, the combination comprising a fender having a wheel access opening therein and an offset panel portion adjacent said opening, said panel portion being connected with the principal body portion of said fender by an integral shoulder, and a fender shield mounted on said fender over said offset panel portion and opening and substantially coextensive with said offset panel portion, said fender shield having projecting ears extending through said shoulder of said fender, a peripheral edge of said shield being developed so that it gradually diverges from said offset panel portion beginning at points adjacent said ears and reaching a maximum at a point remote therefrom, and latching means in proximity to the point of maximum divergence for pulling the entire peripheral edge of said shield into tight engagement with said offset panel portion.

HERBERT S. JANDUS.